3,207,743
EPOXIDATION OF TALL OIL FATTY ACIDS AND ESTERS
Edward A. Bried, Newport, Del., assignor to Hercules Powder Company, Wilmington, Del., a corporation of Delaware
No Drawing. Filed Aug. 16, 1963, Ser. No. 302,700
12 Claims. (Cl. 260—97.5)

This application is a continuation-in-part of application Serial No. 828,054, filed July 20, 1959, now abandoned.

The present invention relates to the preparation of epoxidized products of improved color from tall oil fatty acids and their esters.

Epoxy esters are currently used as stabilizers and plasticizers for poly(vinyl chloride). Two types of esters are commonly used, namely, epoxy triglycerides and alkyl epoxy stearates. The latter esters are particularly useful because of their superior low-temperature properties. These epoxy derivatives are prepared by epoxidation of the unsaturated esters with preformed peracetic acid, formic acid plus hydrogen peroxide or peracetic acid formed in situ. In the in situ processes, peracetic acid is produced by the reaction of acetic acid, hydrogen peroxide, and sulfuric acid and by the reaction of acetic acid and hydrogen peroxide in the presence of acidic ion exchange resins. These procedures may be used on the free acids as well as the esters.

The above referred to procedures are generally quite satisfactory for the preparation of epoxy esters from vegetable glycerides and esters of their fatty acids. However, in using these procedures on tall oil fatty acids or their esters, a deep red color develops during epoxidation. This color is undesirable in premium quality plasticizer—stabilizers for poly(vinyl chloride) and hence is a serious drawback to the acceptance of tall oil fatty acids for this use.

A principal object of the present invention is the provision of a method for the preparation of epoxidized products of improved color from tall oil fatty acids and their esters.

It has now been found that if tall oil fatty acids or tall oil fatty acid esters are treated with a small amount of formaldehyde or formaldehyde-yielding material, in the presence of an acid catalyst, and then distilled, the thus treated tall oil fatty acids or their esters do not develop color during epoxidation. The amount of acid catalyst required is very small.

Having described the invention generally, the following examples are given to illustrate specific embodiments thereof.

EXAMPLE 1

A sample of tall oil fatty acids (100 parts) obtained by the fractional distillation of tall oil under vacuum and having the approximate analysis hereinafter set forth was heated to 100–150° C. One part of formaldehyde as 37% aqueous formaldehyde and 0.1 part sulfuric acid were added with stirring. This addition required about 30 minutes for completion. The heating was continued for one hour following which the crude product was distilled leaving a residue of <5%.

One hundred grams of the formaldehyde treated and distilled tall oil fatty acids and 100 grams of the same tall oil fatty acids which had not been so treated were each dissolved in 100 ml. of hexane in a 500-ml., 3-necked, round-bottomed flask. The flask, in each case, was equipped with a reflux condenser, thermometer, and mechanical stirrer. Formic acid (13.6 g., 91%) was added and the mixture was heated to 60° C. Hydrogen peroxide (40.4 g., 50% aqueous) was added slowly over a one-hour period. The contents were maintained at 60–65° C. for 2½ hours. At the end of that time stirring was stopped and the contents were allowed to cool. Color changes were observed. The tall oil fatty acids which had not been subjected to the formaldehyde and distillation treatments developed a deep red color which did not bleach during this period. The formeldehyde-treated and distilled tall oil fatty acids did not develop any color; in fact, the color appeared to lighten during epoxidation.

EXAMPLE 2

One sample of a commercial tall oil fatty acid mixture which had been subjected to treatment with formaldehyde and distilled in the manner set forth in Example 1 and samples of three different commercial tall oil fatty acid mixtures which had not been so treated were each treated as follows: 50 grams of each sample was dissolved in 50 grams of hexane. The solution, in each case, was added to a 3-necked, 500-ml., round-bottomed flask equipped with stirrer, thermometer, and condenser. The contents were cooled to 15° C. using an ice bath. Maintaining the temperature between 15 and 20° C., peracetic acid (50 g., Becco's 40% in acetic acid) was added dropwise over an hour. At the end of the addition, the contents were stirred for an additional 3 hours at 15–20° C. The two-phase system was then heated to 60° C. for one hour. The contents were cooled. Colors are noted in the table below.

*Table 1*

| Tall oil fatty acids | Color before heating | Color after heating |
|---|---|---|
| Commercial Product 1 (Untreated). | Red | Orange. |
| Commercial Product 2 (Untreated). | Deep orange | Yellow. |
| Commercial Product 3 (Untreated). | do | Do. |
| Commercial Product 4 (Formaldehyde treated and distilled). | Pale yellow | Pale yellow. |

EXAMPLE 3

Except as noted below, the procedure of Example 2 was followed utilizing formaldehyde treated and distilled commercial product 4 (Example 2) and a competitive commercial tall oil fatty acid product. Stirring was stopped one hour after the addition was complete. The reaction mixture separated into two layers. The Gardner color of each layer is recorded in Table 2 below.

*Table 2*

| Time | Formaldehyde treated and distilled Commercial Product 4 | Competitive tall oil fatty acid product |
|---|---|---|
| End of addition | | |
| Hexane layer | 4 | 12 |
| Acetic acid layer | (*) | 17 |
| End of one hour | | |
| Hexane layer | 3 | 8 |
| Acetic acid layer | 8 | 17 |

*Not measured. Estimated to be <12.

EXAMPLE 4

One hundred grams of tall oil fatty acids was heated with agitation under nitrogen at 100° C. First 4 grams of noncalcined Super Filtrol and then 0.7 gram paraformaldehyde were added. The mixture was heated for one-half hour, allowed to cool, and then filtered. The filtrate was then distilled under vacuum to give a 95% yield of distillate. A 10-gram sample of distillate was dissolved in an equal weight of hexane. Ten grams of 40% peracetic acid was added to the stirred solution at 15–18° C. over a one-hour period. After 3 hours at 15–18° C. the temperature was raised to 60° C., where it was held for one additional hour. No change in color was noted during the course of the epoxidation reaction. Filtrol is a proprietary designation for a group of acid-activated adsorbents and catalysts made from the mineral montmorillonite, (Mg,Ca)O.Al$_2$O$_3$.5SiO$_2$.nH$_2$O. They are supplied as white powders, 85–95% passing through a 200-mesh screen.

EXAMPLE 5

One hundred grams of tall oil fatty acids was heated with agitation under nitrogen to 107° C. Three grams of Filtrol 20 and then one gram of paraformaldehyde were added. The mixture was heated at 107° C. for 0.75 hour, allowed to cool, and filtered. The filtrate was then distilled under vacuum to give an 89% yield of distillate.

Ten grams of distillate was dissolved in an equal weight of hexane. To the solution at 15–20° C. was added with stirring, 10 grams of 40% peracetic acid. The addition took 20 minutes, after which the mixture was allowed to remain at 15–20° C. for an additional 20 minutes. No color change was noted. The hexane layer was separated and transferred to a Gardner tube. The color was 4+ on the Gardner scale.

EXAMPLE 6

A tall oil fatty acid mixture (100 parts by weight) and methyl alcohol (100 parts) were heated in an autoclave for one hour at 250° C. The reaction mixture was then allowed to cool to 175° at which time the autoclave was vented in order to strip off the excess methyl alcohol and water. After about one-half hour at 175° no solvent remained. Fresh methyl alcohol was added, and the process repeated.

One hundred parts of the tall oil fatty acid methyl ester mixture, prepared as above described, was heated to 100–150° C. One part by weight of 37% aqueous formaldehyde and 0.1 part of 100% sulfuric acid were added with stirring. The addition required about 30 minutes. The heating was continued for one hour following which the crude product was distilled under vacuum to give a 95%+ yield of distillate and a residue of <5%.

One hundred parts by weight of the formaldehyde-treated and distilled fatty acid methyl esters and 100 parts of the same tall oil fatty acid methyl ester mixture, but not so treated, were each dissolved in 100 ml. of hexane in a 500-ml., 3-necked, round-bottom flask. The flask, in each case, was equipped with a reflux condenser, thermometer, and mechanical stirrer. Formic acid (13.6 g., 91%) was added, and the mixture heated to 60° C. Hydrogen peroxide (40.4 g., 50% aqueous) was added slowly over a one-hour period. The contents were maintained at 60–65° C. for 2½ hours. At the end of that time, stirring was stopped and the contents were allowed to cool. The epoxidized tall oil fatty acid methyl esters, which had not been pretreated with formaldehyde and subsequently distilled, developed a deep red color which could not be made lighter. The epoxidation product of the formaldehyde pretreated and distilled tall oil fatty acid methyl esters was practically colorless.

EXAMPLE 7

A tall oil fatty acid mixture (100 parts by weight) ethylene glycol (10 parts) and sulfuric acid (0.1 part) were heated with efficient mechanical agitation for one hour at 100° C. A water pump was then connected to the system and the temperature of the reaction mixture was increased slowly to 135°. Heating of the reaction mixture under reduced pressure (20 mm. of Hg) was then continued for an additional two hours. When the reaction mixture had cooled to room temperature, it was dissolved in petroleum ether (300 parts). The petroleum ether solution was then extracted twice with dilute sodium hydroxide (200 parts) to remove unchanged fatty acids and sulfuric acid catalyst. Finally, the organic phase was extracted with distilled water, dried over anhydrous sodium sulfate, filtered, and heated to 100° C. under reduced pressure to remove solvent.

One hundred parts of the above tall oil fatty acid glycol ester mixture was heated to 100–150° C. One part by weight of 37% aqueous formaldehyde and 0.1 part of 100% sulfuric acid were added with stirring. The addition required about 30 minutes. The heating was continued for one hour following which the crude product was distilled under vacuum to give a 95%+ yield of distillate and a residue of <5%.

One hundred parts by weight of the formaldehyde-treated and distilled fatty acid glycol esters and 100 parts of the same tall oil fatty acid glycol ester mixture, but not so treated, were each dissolved in 100 ml. of hexane in a 500-ml., 3-necked, round bottom flask. The flask, in each case, was equipped with a reflux condenser, thermometer, and mechanical stirrer. Formic acid (13.6 g. 91%) was added, and the mixture heated to 60° C. Hydrogen peroxide (40.4 g., 50% aqueous) was added slowly over a one-hour period. The contents were maintained at 60–65° C. for 2½ hours. At the end of that time stirring was stopped and the contents were allowed to cool. The epoxidized tall oil fatty acid glycol esters, which had not been pretreated with formaldehyde and subsequently distilled, developed a deep red color which could not be made lighter. The epoxidation product of the formaldehyde pretreated and distilled tall oil fatty acid glycol esters was practically colorless.

EXAMPLE 8

One hundred parts of a tall oil fatty acid methyl ester mixture prepared as in Example 6 was heated with agitation to 100–110° C. First, four parts of Super Filtrol and next one part of paraformaldehyde were added. The resulting mixture was heated at 100–110° C. for an additional one-half hour. When cool, the mixture was filtered. Distillation of the filtrate under vacuum gave a 95% yield of distillate.

One hundred parts by weight of the formaldehyde-treated and distilled tall oil fatty acid methyl esters and 100 parts of the same tall oil fatty acid methyl ester mixture which had not been so treated were epoxidized following the procedure of Example 6. The epoxidation product of the formaldehyde-treated and distilled tall oil fatty acid methyl esters was practically colorless while the untreated methyl esters developed a deep red color.

Example 9

One hundred parts of a tall oil fatty acid glycol ester mixture prepared as in Example 7 was heated to 100–110° C. First, three parts of Filtrol 20 and next one part of paraformaldehyde were added. The mixture was heated at 100–110° C. for one hour, allowed to cool, and then filtered. The filtrate was distilled under vacuum to yield a distillate fraction which comprised 95% of the charge.

One hundred parts of the above-treated and distilled glycol ester mixture and 100 parts of the same glycol ester mixture which had not been so treated and distilled were epoxidized following the procedure of Example 7. The epoxidized product made from the former was practically colorless while the epoxidized product made from the latter developed a deep red color.

The tall oil fatty acids utilized in the examples had the following approximate analyses.

|  | Examples 1–4 and 6–10 | Example 5 |
| --- | --- | --- |
| Unsaponifiables, percent | 1.8 | 5.4 |
| Rosin acids, percent | 1.3 | 5.2 |
| Color, Gardner | 4+ | 11+ |
| Fatty acids, by difference, percent | 96.9 | 89.4 |
| Composition of fatty acids: |  |  |
| Linoleic acids, percent | 46.0 | 51.8 |
| Oleic acids, percent | 51.0 | 22.6 |
| Saturated acids, percent | 3.0 | 10.6 |
| Unidentified acids, percent |  | 15.0 |
| Acid number | 194 | 182 |
| Iodine number | 130 | 145 |

It will be apparent from the examples herein that the formation of color during expodiation of tall oil fatty acids and their esters is substantially inhibited if, prior to epoxidation, the tall oil fatty acids or their esters are heated with formaldehyde in the presence of an acid catalyst and then distilled.

The process of the invention is designed for the treatment of fatty acids and/or fatty acid mixtures derived from tall oil. Tall oil contains approximately 90% of acidic material which is composed of essentially equal parts of fatty and resin acids. These are generally separated by fractional distillation at reduced pressure, it being possible under proper operating conditions to obtain fatty acid and resin acid fractions each contaminated with as little as 1–2% of the other. The specific composition of a mixture of fatty acids derived from tall oil will vary depending upon the source material and the type and conditions of treatment. In general, however, such mixtures will be made up mostly of unsaturated acids such as oleic, linoleic and linolenic acids with smaller amounts of saturated acids such as palmitic and stearic acids and minor amounts of resin acids.

The invention is also applicable to the treatment of tall oil fatty acid esters such as those produced by esterification of tall oil fatty acids with monohydric aliphatic saturated and unsaturated alcohols such as methyl, ethyl, propyl, butyl, 2-ethyl hexanol, isoctyl, allyl, oleyl, and so on, polyhydric alcohols such as glycols, glycerols and pentaerythritol, and aromatic alcohols. The butyl and isooctyl esters and triglycerides are preferred.

In the preparation of epoxidized products in accordance with the invention the tall oil fatty acids or esters are first treated with formaldehyde or a formaldehyde-yielding material in the presence of an acid catalyst usually at temperatures from about 25° C. to about 200° C. In a preferred procedure the tall oil fatty acids or esters are first heated to temperatures from about 100° C. to about 150° C. and the formaldehyde and catalyst then added with stirring. This addition will require from a few minutes to one hour. Following this, the heating will usually be continued for another hour, although this may vary from about 15 minutes to about 5 hours depending upon temperatures employed and other conditions of treatment. The crude product is then distilled under conditions such as to remove the nondistillable and/or high boiling reaction products of the color-forming materials.

The amount of formaldehyde or formaldehyde-yielding material utilized will desirably be from about 0.25% to about 5% by weight, based on the weight of the tall oil fatty acids or esters. Thus, amounts below 0.25% do not give the desired improvements while amounts about 5% produce little, if any, added improvement. Within the stated range optimum results are usually obtained utilizing from about 1% to about 2% formaldehyde and this, therefore, is the preferred range.

While all forms of formaldehyde are operable, the aqueous solution is preferred because it is most economical. The formaldehyde may be used as such or in any form, which in the presence of acid and heat, will yield free formaldehyde, such as paraformaldehyde and acetals of formaldehyde.

The formaldehyde treatment of the tall oil fatty acids or esters is carried out in the presence of an acid catalyst. In general, the amount of acid catalyst employed may vary from about 0.01% to about 10%. However, for optimum results, it is preferred to utilize from about 0.05% to about 5% catalyst based on the weight of the tall oil fatty acids or esters. Typical acid catalysts which can be used herein are hydrochloric, phosphoric and similar inorganic acids as well as organic acids, such as paratoluene sulfonic acid, acetic acid, and so on. In addition, it is also possible to use solid catalysts such as acid activated clays, acidic ion exchange resins, sulfuric acid supported on kieselghur, and so on.

Following the formaldehyde and distillation treatments the tall oil fatty acids or esters are epoxidized. Epoxidized. Epoxation may be carried out with prepared lower aliphatic organic peracids such as peracetic acid, performic acid, perbutyric acid and others. These reactions may also be carried out using the so-called "in situ" method wherein peracid is formed during the course of the reaction in the reaction medium from calculated quantities of hydrogen peroxide and the corresponding organic acid. Furthermore, such epoxidation reactions, using prepared peracids or peracids formed in situ, may be carried out with or without a solvent present in the reaction mixture, which solvents may be benzene, hexane or other inert solvents. At the end of the reaction period the epoxidized product, which separates as an oil or solid, may be recovered by usual methods, washed with water and dried.

The epoxidation of the tall oil fatty acids or esters in accordance with the invention may be carried out as generally described above. For a more specific and complete description of processes and procedures suitable for carrying out these reactions, recourse may be had to U.S. 2,458,484, U.S. 2,569,502, U.S. 2,692,271, U.S. 2,801,253 and U.S. 2,810,733.

The process of the invention thus provides epoxidized tall oil fatty acids or tall oil fatty acid esters of improved color. Moreover, such improved products are obtained very economically and without the necessity of expensive and time-consuming chemical treatments. While preferred embodiments of the invention have been described herein, the invention is not to be construed as limited thereby except as the same may be included in the following claims.

What I claim and desire to protect by Letters Patent is:

1. In a process for the preparation of epoxidized products from a material selected from the group consisting of tall oil fatty acids and tall oil fatty acid esters wherein said material is epoxidized by reaction with a lower aliphatic peracid, the improvements of (1) treating said material prior to its epoxidation with a material selected from the group consisting of formaldehyde and paraformaldehyde in the presence of an inorganic acid catalyst, (2) distilling the thus-treated material and then (3) epoxidizing the distilled material by reaction with a lower aliphatic peracid.

2. A process in accordance with claim 1 wherein said material is treated prior to its epoxidation with formaldehyde.

3. A process in accordance with claim 1 wherein said material is treated prior to its epoxidation with paraformaldehyde.

4. A process in accordance with claim 1 wherein the catalyst is sulfuric acid.

5. A process in accordance with claim 4 wherein the lower aliphatic peracid is peracetic acid.

6. A process in accordance with claim 4 wherein the lower aliphatic peracid is performic acid.

7. In a process for the preparation of epoxidized products from a fatty acid mixture obtained by the fractional distillation of tall oil wherein said fatty acid mixture is epoxidized by reaction with a lower aliphatic peracid, the improvements of (1) treating said material prior to its epoxidation with a material selected from the group consisting of formaldehyde and paraformaldehyde in the presence of an inorganic acid catalyst, (2) distilling the thus-treated material and then (3) epoxidizing the distilled material by reaction with a lower aliphatic peracid.

8. A process in accordance with claim 7 wherein said material is treated prior to its epoxidation with formaldehyde.

9. A process in accordance with claim 7 wherein said material is treated prior to its epoxidation with paraformaldehyde.

10. In a process for the preparation of epoxidized products from tall oil fatty acid esters wherein said tall oil fatty acid esters are epoxidized by reaction with a lower aliphatic peracid, the improvements of (1) treating said material prior to its epoxidation with a material selected from the group consisting of formaldehyde and paraformaldehyde in the presence of an inorganic acid catalyst, (2) distilling the thus-treated material and then (3) epoxidizing the distilled material by reaction with a lower aliphatic peracid.

11. A process in accordance with claim 10 wherein said material is treated prior to its epoxidation with formaldehyde.

12. A process in accordance with claim 10 wherein said material is treated prior to its epoxidation with paraformaldehyde.

References Cited by the Examiner
UNITED STATES PATENTS

| | | | |
|---|---|---|---|
| 2,458,484 | 1/49 | Terry et al. | 260—348 |
| 2,720,514 | 10/55 | Rummelsburg | 260—97 |
| 2,801,253 | 7/57 | Greenspan et al. | 260—406 |
| 2,810,733 | 10/57 | Greenspan | 260—348.5 |
| 2,903,465 | 9/59 | Suter et al. | 260—348.5 |
| 2,985,537 | 5/61 | Watkins | 260—97.5 |

LEON J. BERCOVITZ, *Primary Examiner.*